(No Model.)

J. B. ARMSTRONG.
SULKY.

No. 482,114. Patented Sept. 6, 1892.

Witnesses
E. S. Walker
G. A. Tauberschmidt

Inventor
John Belmer Armstrong
by F. W. Ritter Jr
atty

THE NORRIS PETERS CO., PHOTO-LITHO., WASHINGTON, D. C.

UNITED STATES PATENT OFFICE.

JOHN BELMER ARMSTRONG, OF GUELPH, CANADA.

SULKY.

SPECIFICATION forming part of Letters Patent No. 482,114, dated September 6, 1892.

Application filed April 7, 1890. Serial No. 346,807. (No model.) Patented in Canada March 27, 1888, No. 28,759.

*To all whom it may concern:*

Be it known that I, JOHN BELMER ARMSTRONG, a subject of the Queen of Great Britain, residing at the city of Guelph, in the county of Wellington, in the Province of Ontario, Canada, have invented certain new and useful Improvements in Sulky-Gears, (for which I have received a Canadian patent, No. 28,759, of March 27, 1888;) and I hereby declare the following to be a full, clear, and exact description of the same, reference being had to the accompanying drawings, wherein—

Figure 1:
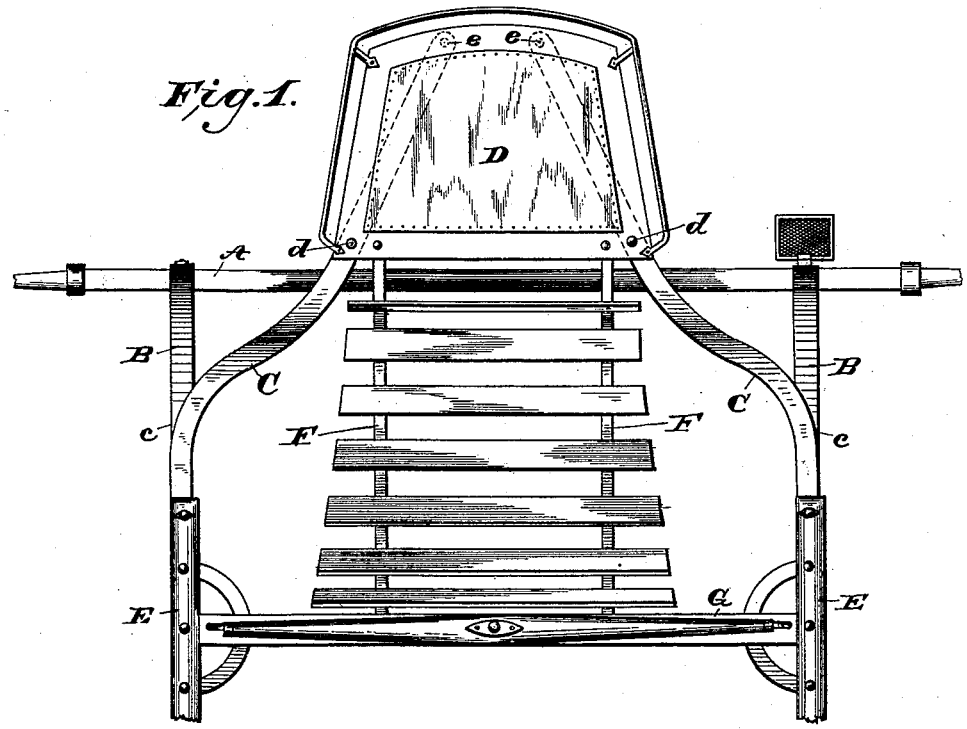
Figure 2:
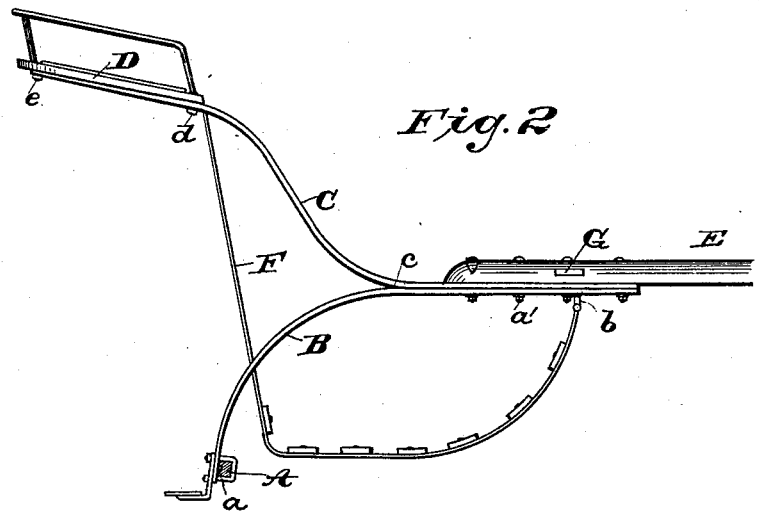

Figure 1 is a plan view of a sulky embodying my invention; and Fig. 2 is a side elevation of the same, partly in section.

Like letters refer to like parts wherever they occur.

My invention relates to the construction of that class of two-wheeled vehicles commonly termed "sulkies," and has for its object the production of a light, strong, handsome, and easy-riding vehicle, one comparatively free of what is known as "horse motion," and one in which the shoulders of the horse are relieved from the jar caused by the passage of the vehicle over rough ground.

To this end the main feature embraces the combination, with the axle and shaft, of interposed curved single-plate-spring connections rigidly secured to both axle and shafts and upwardly-curved spring-seat supports so connected with the shafts as to support the seat therefrom and at their points of connection arranged in line with the curved single-plate-spring connections between the shaft and axle, so that when force is applied to the ends of said springs distant from the shaft, as in case of increased load upon the seat or the wheels striking obstructions, the contiguous portions of said springs come together for a space, so as to neutralize the shock or increased load and relieve both the horse and the rider from the effect of sudden jars, shocks, &c.

There are other minor features of the invention, all as will hereinafter more fully appear.

I will now proceed to describe my invention more fully, so that others skilled in the art to which it appertains may apply the same.

In the drawings, A indicates the axle; B B, flexible curved single-plate springs, of which two are employed for connecting the axle and shafts, and said springs curve upwardly from the axle to the shafts; C C, inwardly and upwardly curved elastic single-plate springs for supporting the driver's seat from the shafts; D, the driver's seat; E, the shafts; F, the foot-rests, and G the shaft-bar.

In constructing my improved gear the shafts E are raised above the axle A and connected therewith by flexible upwardly-curved single-plate springs B B, the ends of said springs being secured rigidly to the axle by clips and teats $a$, or in other suitable manner, and bolted or otherwise rigidly attached to the shafts, as at $a'$.

Beneath the shaft E and on top of the springs B B, I place single-plate springs C C, which springs may be also secured to the shaft E by the bolts $a'$, and curve thence inwardly and upwardly to the proper height to form a spring-support for the seat D. The relation of the springs B B and C C at their point of connection to the shafts causes them to set or come in contact for a portion of their length whenever weight or force is applied to the opposite ends of said springs, as in case of increased load on the seat or the wheels striking an obstruction, and such set, while it relieves the horse and rider of shock, causes the gear to take up the jar and accommodate itself to varying conditions. Both sets of springs are securely fastened in line to the shafts E and are preferably tapered in thickness, as well as curved, for the purpose of equalizing the action in the stock throughout; but a plain steel flexible bar properly bent to suit the position of the axle and shafts would answer.

It will be seen that the elasticity of the springs B B will relieve the shoulders of the horse from the jar caused by the vehicle passing over rough ground, and that the elasticity of the springs C C, combined with that of the springs B B, will also relieve the occupant of the sulky from the jar mentioned. The curved shape of the springs also affords easy access to the driver's seat and leaves plenty of leg-room inside the ways.

When loaded, the springs C and B close together from the point $c$, thus gradually reducing the leverage of the springs C, which adds to the ease of the riding motion and in a very great degree obviates what is termed "horse motion." To further assist a perfect action, the ends of the springs C from $d$ to $e$ are gradually tapered to allow for flexion of the plates between those points.

The foot-rests F are rigidly fastened to the bottom of the seat D and flexibly connected to the shaft-bar G by the free-swinging shackles $b$, or in other suitable manner.

The invention hereinbefore described, especially the connection between the axle and the shaft by the single-plate curved flexible springs, may be applied to gigs or any other two-wheeled vehicles with equally good results.

Having thus described my invention, what I claim, and desire to secure by Letters Patent, is—

1. In a sulky, the combination, with the axle and shafts, of curved single-plate steel springs which connect the shafts and axle and are rigidly connected thereto, and upwardly-curved single-plate springs or seat-supports rigidly connected with the shafts in line with the first-mentioned springs, substantially as and for the purposes specified.

2. In a sulky, the combination, with the axle, shafts, and seat, of two sets of reversely-curved single-plate tempered-steel springs, which springs taper in thickness, one set of said springs rigidly connected to the axle and the other set connected with the seat, and both sets rigidly connected with the shafts at adjacent points and in line with each other, substantially as and for the purposes specified.

In testimony whereof I affix my signature, in presence of two witnesses, this 1st day of April, 1890.

JOHN BELMER ARMSTRONG.

Witnesses:
R. L. TORRANCE,
DEE MONTGOMERY.